US012761896B2

(12) United States Patent
Hopfer

(10) Patent No.: US 12,761,896 B2
(45) Date of Patent: Oct. 13, 2026

(54) SYSTEM AND METHOD FOR AUTOMATED USER MULITFLASH AND BOOT CHECK OF STREAMING MEDIA DEVICES

(71) Applicant: Communications Test Design, Inc., West Chester, PA (US)

(72) Inventor: Timothy Hopfer, Downingtown, PA (US)

(73) Assignee: Communications Test Design, Inc., West Chester, PA (US)

( * ) Notice: Subject to any disclaimer, the term of this patent is extended or adjusted under 35 U.S.C. 154(b) by 180 days.

(21) Appl. No.: 18/533,554

(22) Filed: Dec. 8, 2023

(65) Prior Publication Data

US 2025/0190200 A1 Jun. 12, 2025

(51) Int. Cl.

| | |
|---|---|
| ***G06F 8/65*** | (2018.01) |
| ***G06K 7/14*** | (2006.01) |
| ***H04N 21/435*** | (2011.01) |
| ***H04N 21/442*** | (2011.01) |

(52) U.S. Cl.

CPC ............. *G06F 8/65* (2013.01); *G06K 7/1413* (2013.01); *H04N 21/435* (2013.01); *H04N 21/4424* (2013.01)

(58) Field of Classification Search

CPC .................................................. G06F 8/63–65

See application file for complete search history.

(56) References Cited

U.S. PATENT DOCUMENTS

| | | | | |
|---|---|---|---|---|
| 7,043,664 | B1 * | 5/2006 | Chiloyan | G06F 11/1417 714/E11.133 |
| 9,442,831 | B1 * | 9/2016 | Aleksyeyev | G06F 11/0721 |
| 11,564,194 | B1 | 1/2023 | DeCenzo | |
| 2008/0052698 | A1 * | 2/2008 | Olson | G06F 8/658 717/168 |
| 2008/0168435 | A1 * | 7/2008 | Tupman | G06F 8/65 717/173 |
| 2014/0187172 | A1 | 7/2014 | Partee | |
| 2015/0222709 | A1 | 8/2015 | Thielen et al. | |
| 2017/0227965 | A1 | 8/2017 | DeCenzo et al. | |
| 2018/0115733 | A1 | 4/2018 | Fischer et al. | |
| 2021/0011824 | A1 * | 1/2021 | Parsons | B25J 9/1679 |
| 2021/0344991 | A1 | 11/2021 | Todd | |
| 2023/0319917 | A1 | 10/2023 | Hulse et al. | |

OTHER PUBLICATIONS

International Search Report and Written Opinion issued for PCT International Application No. PCT/US2024/010854 dated Jul. 25, 2024, 13 pages.

* cited by examiner

*Primary Examiner* — Duy Khuong T Nguyen
(74) *Attorney, Agent, or Firm* — Duane Morris LLP

(57) ABSTRACT

A system includes a computer system including a user interface and a monitor; a storage medium readable by the computer system and storing an application to interface the computer system and a streaming media device; and a laser scanner to scan a bar code indicating identification data of the streaming media device.

16 Claims, 5 Drawing Sheets

SYSTEM AND METHOD FOR AUTOMATED USER MULITFLASH AND BOOT CHECK OF STREAMING MEDIA DEVICES

BACKGROUND

The present disclosure relates to a system and method of a clearing and updating a streaming media device, e.g., Amazon Fire® TV Stick.

Customer returns or those streaming media devices whose status is suspect or unknown can be refurbished and put back into the stream of commerce. In addition to inspection, renewal, and cleaning of such devices prior to repackaging and shipment, the memory of streaming media devices need to be cleared of any previous customer data and/or previously loaded applications. Also, the firmware needs to be updated to the latest version and the devices tested to make sure they boot properly after being updated.

Previously, user multiflash and boot check for streaming media devices was often performed using a third-party tool kit. This provided little control of the process and if issues or bugs would arise, operations would have to wait for the another party to provide updates and fixes. The tool kit and previous process is also slower as only one device can be flashed or tested at a time using two separate hardware systems, with each device taking about five minutes or more to process. Additionally, logging and traceability is not automated. Entry of individual device records and results are manually entered into a database. A simpler and elegant system and method that is automated to more efficiently process and test streaming media devices with less setup time and training is needed.

SUMMARY OF THE DISCLOSURE

The exemplary embodiments disclosed herein are directed to solving the issues relating to one or more of the problems presented in the prior art, as well as providing additional features that will become readily apparent by reference to the following detailed description when taken in conjunction with the accompanying drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

The disclosed system and method includes a custom testing application running on a computer system with a monitor attached. The devices to be tested are connected to micro USB cables that connect to the computer system or a USB hub connected to the computer system.

The disclosed system and method is an improvement over that currently available in that it allows from anywhere from 1-16 devices to be tested simultaneously at one operator station. This significantly increases the throughput of devices through User Mutliflash and Boot Check processes and decreases the number of stations and hardware necessary. The disclosed system and method creates detailed logs that allow for traceability and troubleshooting. User firmware that is installed on the devices is verified and validated prior to flashing the devices to prevent the wrong firmware from being flashed. Results are entered into a database automatically. Setup and training are easier than previously available test stations.

To overcome the problems described above, embodiments of the present disclosure include a system including a computer system including a user interface and a monitor; a storage medium readable by the computer system and storing an application to interface the computer system and a streaming media device; and a laser scanner to scan a bar code indicating identification data of the streaming media device.

The system can further include a USB hub configured to connect one to sixteen streaming media devices to the computer system.

In an aspect, the computer system is configured to flash firmware to and boot check the streaming media device.

In an aspect, the system automatically performs detecting, validating, flashing, boot checking, and recording data when clearing and updating the streaming media device.

In another embodiment, a method includes entering a serial number of a streaming media device into a computer system; connecting the streaming media device to the computer system; flashing firmware and boot checking the streaming media device; and automatically recording a result of the flashing firmware and the boot checking into a database of the computer system.

In an aspect, the entering of the serial number of the streaming media device includes scanning a bar code on the streaming media device.

The method can further include automatically detecting the streaming media device by the computer system.

The method can further include reading a serial number of the streaming media device via a connection to the computer system; and comparing the serial number of the streaming media device entered to the serial number of the streaming media device read by the computer system to validate the serial number of the streaming media device.

In an aspect, performing the flashing firmware to the streaming media device includes comparing a version of the firmware stored on the computer system to a known latest version of the firmware stored in a database.

In an aspect, performing the flashing firmware to the streaming media device includes setting access flags on the streaming media device to place the streaming media device into a diagnostic mode.

The method can further include verifying that the streaming media device boots properly.

The method can further include comparing a version of the firmware of the streaming media device to a version of the firmware flashed to the streaming media device.

The method can further include resetting access flags on the streaming media device to restrict access to the streaming media device.

In an aspect, connecting the streaming media device includes connecting one to sixteen streaming media devices.

In an aspect, the flashing firmware and boot checking of the one to sixteen streaming media devices is performed simultaneously to each of the one to sixteen streaming media devices connected to the computer system.

In an aspect, the computer system includes a monitor showing a status of the method for the streaming media device.

In an aspect, the computer system includes a monitor showing a status of the method for each of the one to sixteen streaming media devices.

In an aspect, the automatically recording the result includes saving a data record including a model and the serial number of the streaming media device, a version of the flashed firmware, and verification that the streaming media device booted properly.

In an aspect, a non-transitory computer-readable medium includes executable instructions that when executed by a processor cause the processor to perform the steps of flashing firmware and boot checking the streaming media device and automatically recording the result.

In another embodiment, a computer system includes a USB interface; and a storage medium readable by the computer system and storing an application to interface the computer system and a streaming media device, wherein the computer system, by running the application, automatically: detects the streaming media device after the streaming media device has been connected to the USB interface, flashes firmware to the streaming media device, validates the firmware flashed to the streaming media device, verifies that the streaming media device boots properly after flashing the firmware, and records a result of running the application.

In an aspect, the USB interface includes one to sixteen connection ports to which one to sixteen streaming media devices can be connected, respectively, and by running the application, simultaneously performs the automatic steps on each of the one to sixteen streaming media devices connected to the USB interface.

The above and other features, elements, characteristics, steps, and advantages of the present invention will become more apparent from the following detailed description of preferred embodiments of the present invention with reference to the attached drawings.

DETAILED DESCRIPTION

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

A streaming media device transforms a television into a smart one. That is, the streaming media device allows streaming of video and music, playing games, and installation of applications via a television. The streaming media device provides the ability to watch TV shows and movies from streaming services in one place via one platform. The streaming media device comes in several different brands and models that connect to the internet via Wi-Fi to a local router.

The streaming media device has a USB connection to power the device and to communicate with the device. The USB interface is used to send commands and install firmware. The streaming media device also has an HDMI connector to plug into a mating connector on a TV to provide audio and video to the TV. The streaming media device can be paired to a hand held remote control device and include voice interaction capabilities to search and launch content, as well as control other smart home devices.

Like many smart and multi-media devices, used streaming media devices can be returned by consumers as potentially being defective, not working, or no longer being used. Used streaming media devices can then be renewed, refurbished, repackaged, and provided back into the stream of commerce.

The test system and method described below provides security in that it validates the correct firmware is flashed on the streaming media device under test, it increases productivity in that a single test station can now run up to 16 devices at the same time, results are automatically entered into a database, and the system is easier to setup and train operators to use.

Figure 1:
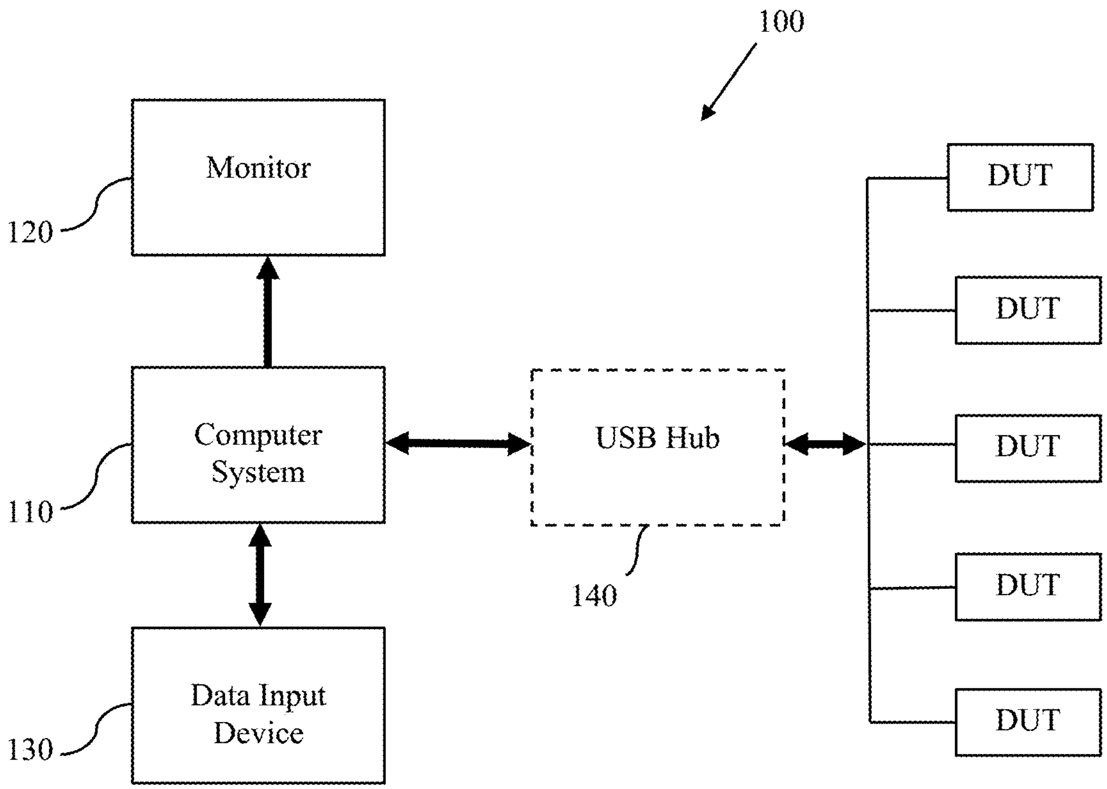
FIG. 1 is a block diagram of a system for automated user mulitflashing and boot checking of streaming media products, according to an embodiment of the present disclosure.

FIG. 1 illustrates an exemplary system 100 for automated user multiflash and boot check of streaming media devices according to an embodiment of the present disclosure. As shown in FIG. 1, the system 100 can include a computer system 110, a monitor 120, and a data input device 130. If the computer system 110 does not have enough USB ports installed, a USB hub 140 can be included to expand the number of USB ports available to connect to streaming media devices under test (DUT). The computer system 110 can be connected to and process up to 16 DUTs at the same time.

The computer system 110 can include computing components, such as one or more processors, one or more memory devices storing software instructions executed by the processor(s), an operator interface including a keyboard, mouse, and the monitor 120, and data stored in a memory. Stored software instructions can include a program or an application for operating the system 100 along with a graphic user interface (GUI) to assist an operator. The one or more processors can be a single microprocessor or multiple microprocessors, field programmable gate arrays (FPGAs), digital signal processors (DSPs), a network, or any suitable combination of these or other components capable of executing particular sets of instructions. Computer-readable instructions can be stored on a tangible non-transitory computer-readable medium, such as a flexible disk, a hard disk, a CD-ROM (compact disk-read only memory), an MO (magneto-optical), a DVD-ROM (digital versatile disk-read only memory), a DVD RAM (digital versatile disk-random access memory), a semiconductor memory, or the cloud. The computer system 110 can include a server or network of computers. The computer system 110 can include an output device such as a printer and the monitor 120.

The computer system 110 can include a custom interface application programmed to interface with the DUTs and automatically perform the steps necessary to detect, validate, flash, boot check, and record data when clearing and updating a streaming media device. This application can include a graphical user interface (GUI) like that shown in FIG. 3.

Figure 2A:
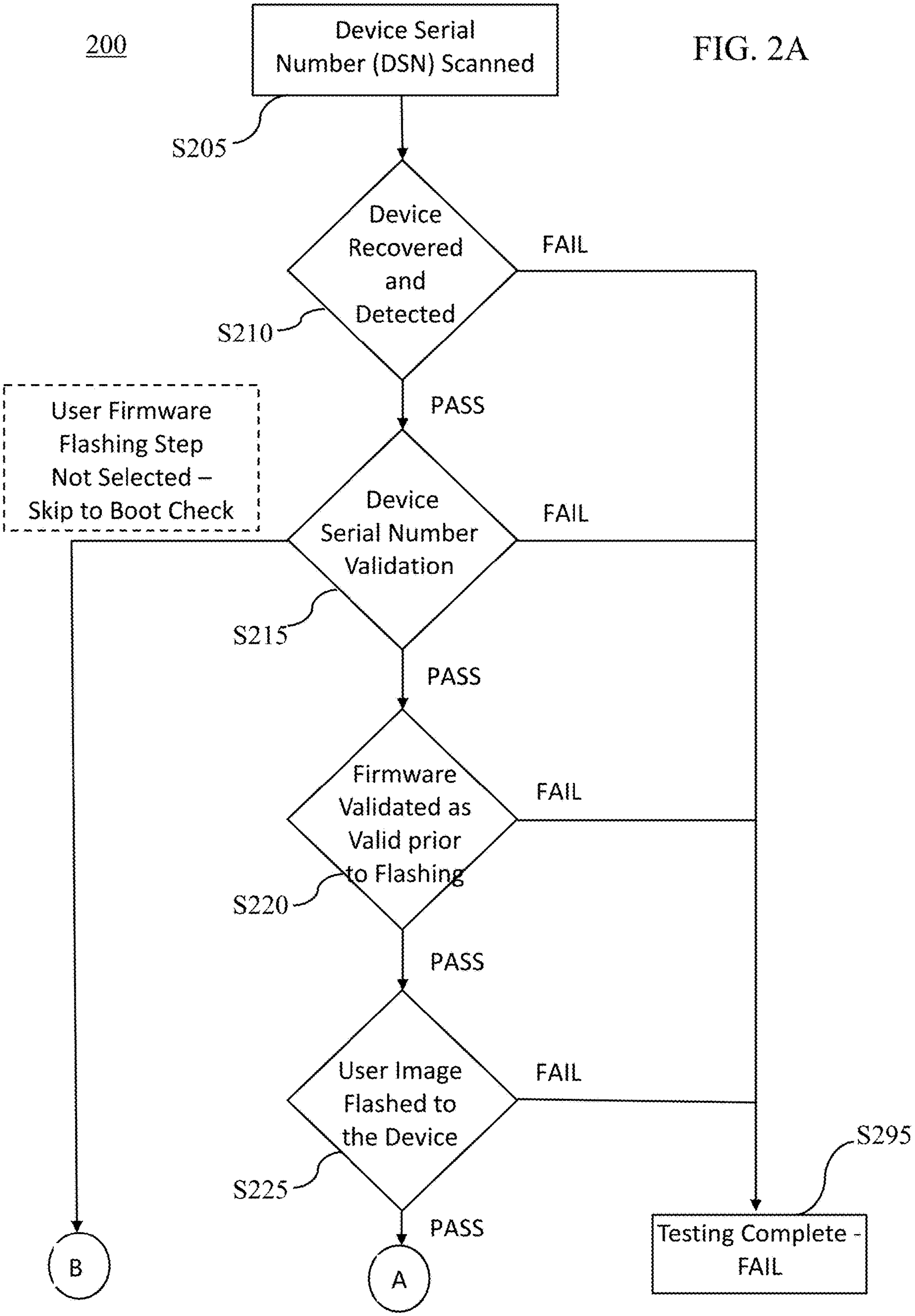
FIG. 2A to FIG. 2C is a flow chart of an automated method, according to an embodiment of the present disclosure.
Figure 2B:
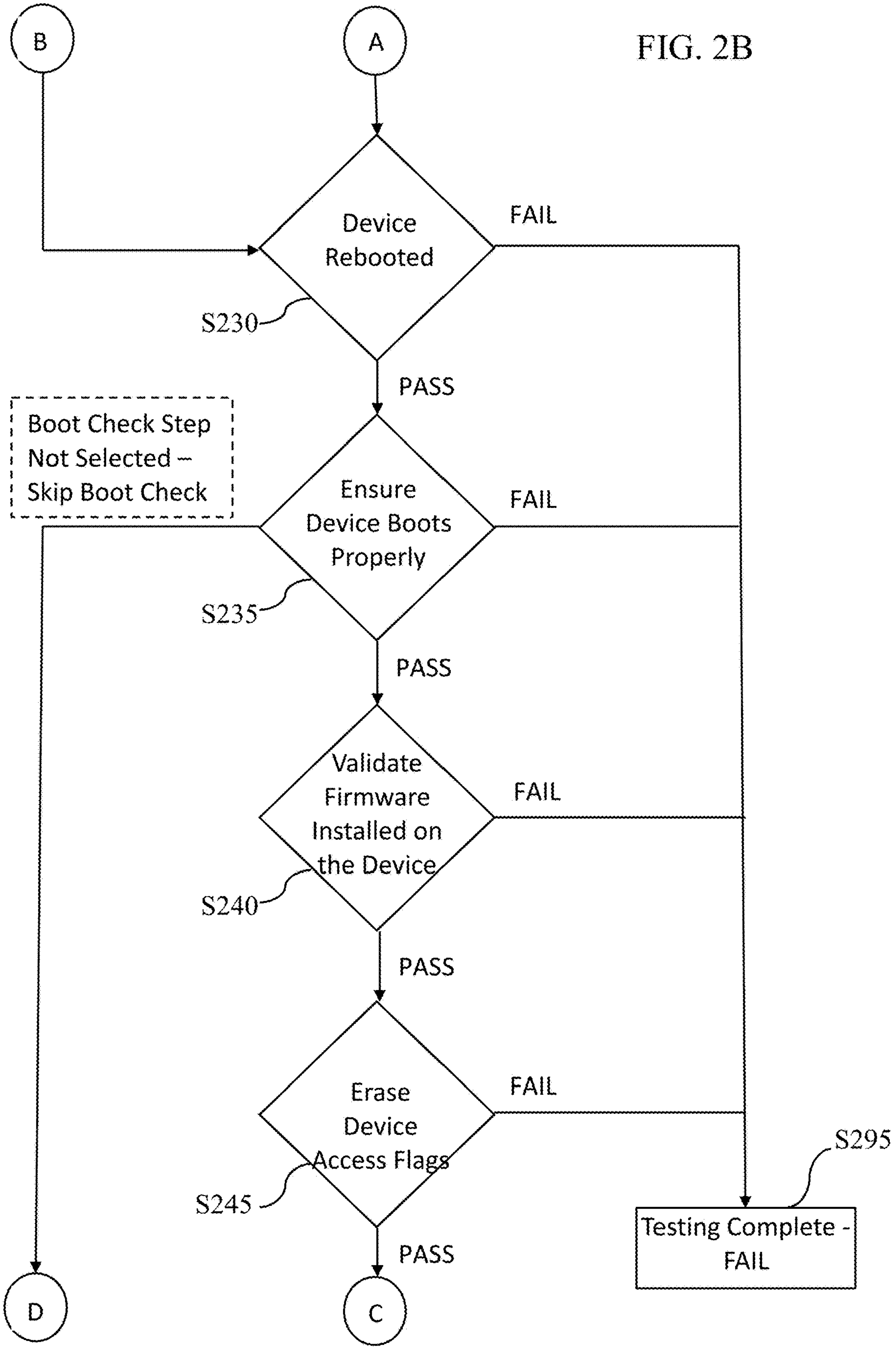
Figure 2C:
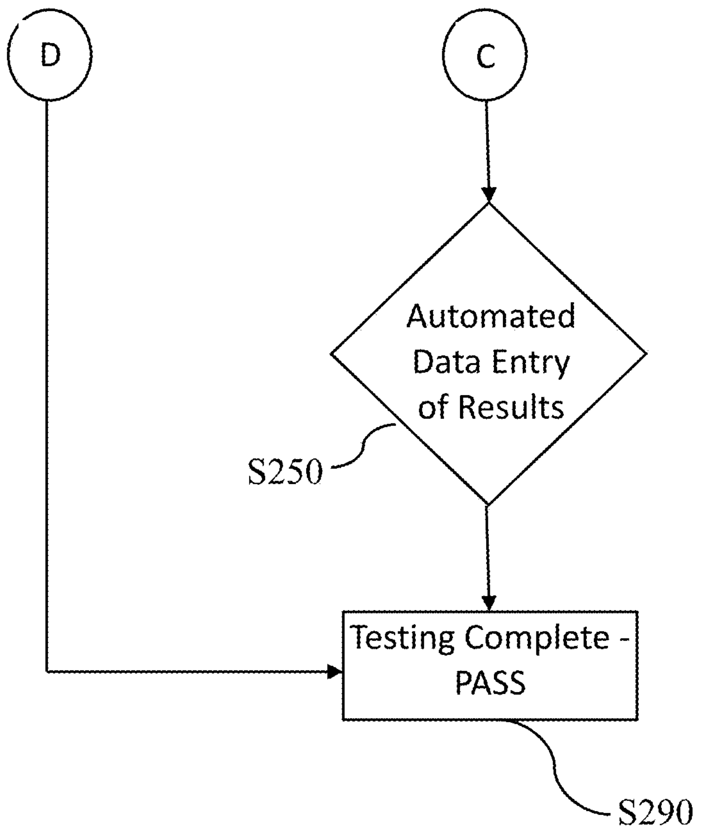

FIGS. 2A to 2C show steps of a method 200 to detect, validate, flash, boot check, and record data for renewing a streaming media device under test. FIG. 2B is a continuation of the process flow from FIG. 2A and FIG. 2C is a continuation of the process flow from FIG. 2B. The method 200 can be performed using the system 100 running the custom application. The method 200 can include an option to perform a portion of the steps shown and described. For example, it is possible that the method can include either firmware flashing or boot check to be backward compatible with the existing two-system setup. More typically, performing the method 200 will include all of the steps of firmware flashing and boot check. The options can be user selectable via the GUI shown in FIG. 3. A DUT is deemed to fail the method 200 if it fails at any step. The failure is recorded and a failed DUT can be removed from connection to the USB Hub 120 and set aside for further diagnostics and disposition.

FIG. 2A shows that a first step S205 of the method 200 can begin by scanning a device serial number (DSN) of a streaming media device to be updated and tested into the system 100. A laser scanner can be used as a data input device 130 of the system 100 to scan a barcode on the streaming media device to record a device serial number represented on a device label. The streaming media device can be connected to a USB cable to the USB Hub 140 or directly to the computer system 110 and become a DUT before or after scanning the DSN into the system 100 at step S205.

After being connected to the system 100, the system 100 automatically attempts to recover and detect the DUT at step S210 using a recovery tool that will allow the device to enter Fastboot mode and be detected. If the DUT is detected, then the step is passed and the application proceeds to the next step. If the DUT is not detected, then the step fails, a failure record is automatically recorded, and processing of the DUT is terminated at step S295. At step S295, the application saves the results of the method 200 in a data record generated for the DUT based on its serial number that was previously entered and saved in the computer system 110. The data record can include individual DUT information and information about the failure.

At step S215, the application reads the serial number reported by the DUT and compares that serial number to that scanned into the system 100. If the two DSNs match, then the step is passed and the application proceeds to the next step. If the DSNs do not match, then the step fails and processing of the DUT is terminated at step S295. If it has been determined that the firmware does not need to be updated on the DUT and an option selected by an operator to only perform a boot check, the method can continue at step S230 to reboot the DUT. If it has been determined that the firmware needs to be updated on the DUT, the process can continue at step S220.

At step S220, the application validates the firmware as valid prior to flashing the latest version on the DUT. This is done by comparing the firmware version stored on the test computer system to the known latest firmware version stored in a database. If the firmware is validated, as the firmware versions matching, then the step is passed and the application proceeds to the next step. If the firmware is not validated, as the firmware version stored on the test system is not the same version as stored in the database, then the step fails and processing of the DUT is terminated at step S295.

At step S225, a user image of the most recent version of the firmware is flashed to the DUT. If the firmware is flashed, then the step is passed and the application proceeds to the next step. If the firmware cannot be flashed, then the step fails and processing of the DUT is terminated at step S295.

At step S230, the DUT is rebooted. A command such as "Fastboot reboot-bootloader" is sent from the computer system 100 to the DUT to instruct the DUT to boot back into fastboot. If the DUT reboots, then the step is passed and the application proceeds to the next step. If the DUT fails to boot properly, then the step fails and processing of the DUT is terminated at step S295. The application waits for a predetermined amount of time. If the DUT is detected in Fastboot, the application detects the DUT booted and commands can be run in boot check.

At step S235, the application ensures that the DUT boots properly. There are commands for each streaming media device model that are run to verify the DUT booted properly and the firmware was installed on the DUT. If the DUT reboots properly, then the step is passed and the application proceeds to the next step. If the DUT fails to boot properly, then the step fails and processing of the DUT is terminated at step S295.

At step S240, the application validates the firmware installed on the DUT. The application sends a command to the DUT to retrieve the firmware version from the DUT. That firmware version is compared to the firmware version installed at step S225. If the firmware is validated, then the step is passed and the application proceeds to the next step. If the firmware not validated, then the step fails and processing of the DUT is terminated at step S295.

At step S245, the application erases DUT access flags. Access flags are set via commands to the DUT after the DUT is unlocked. Access flags need to be set in the DUT to be able to boot into a diagnostic mode. These flags are set during flashing at step S225. The access flags need to be removed/reset because they allow access to the DUT. The access flags are checked in the boot check process by commands to verify that the access flags have been reset to no longer allow access to the DUT. If the DUT access flags have been erased, then the step is passed and the application proceeds to the next step. If DUT access flags have not been erased, then the step fails and processing of the DUT is terminated at step S295.

At step S250, the application saves the results of the method 200 in a data record generated for the DUT based on its serial number that was previously entered, validated, and saved in the computer system 110. The data record can include individual DUT information such as model and serial number, the firmware version, and verification that the DUT booted properly.

At step S290, testing is complete. The DUT can be disconnected from the system 100 and proceed for further evaluation and processing.

Figure 3:
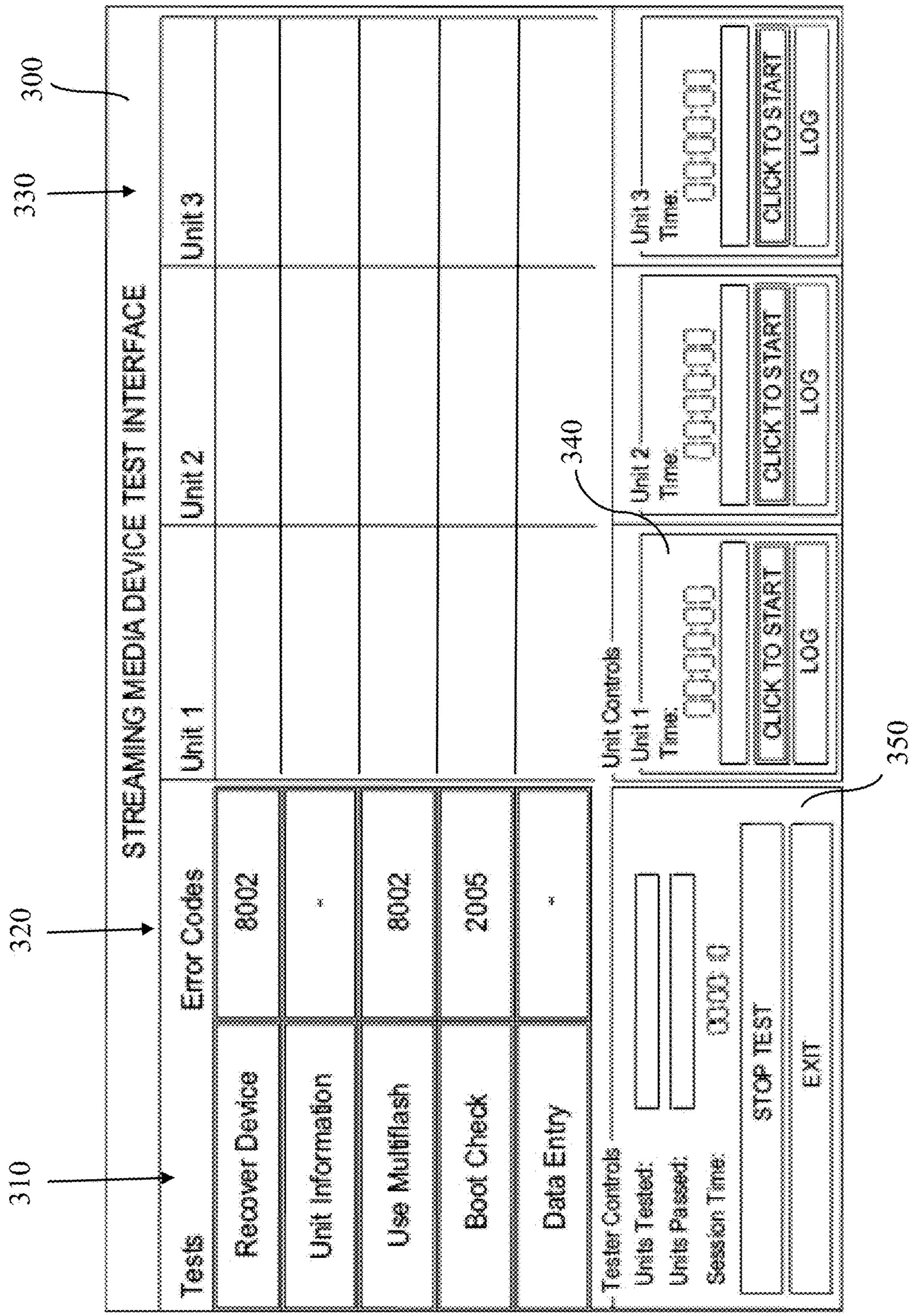
FIG. 3 is a view of a graphic user interface.

FIG. 3 is an example page of the graphical user interface (GUI) from the application interfacing the test computer system to the DUT shown on the monitor 120. The GUI page 300 can include multiple fields of data including a listing of tests or processes steps 310, a listing of error codes 320 corresponding to the different process steps 310, and status fields 330 for DUT's. Although status fields 330 for three DUTs is shown, it should be understood that any number can be shown as corresponding to the number of connections to the USB is possible. The status fields 330 can include a symbol or notation indicating the progress of the corresponding DUT during testing. For example, the status fields 330 can include a green check if the corresponding process step for that DUT has passed or a red X if the DUT has failed that step.

Additionally, the GUI page 300 can include summary fields 340 and 350. A summary field 340 can indicate a total test time for a corresponding DUT and buttons used to start testing on the DUT and show more details of logged data for that DUT. Another summary field 350 can be used to show the status of a testing session.

The above-described embodiments of the present disclosure can be implemented in any of numerous ways. For example, the embodiments can be implemented using hardware, software, or a combination thereof. When implemented in software, the software code can be executed on any suitable computer, processor, or collection of processors, whether provided in a single computer or distributed among multiple computers. Such processors can be implemented as integrated circuits, with one or more processors in an integrated circuit component. Though, a processor can be implemented using circuitry in any suitable format.

Additionally, or alternatively, the above-described embodiments can be implemented as a non-transitory computer readable storage medium embodied thereon a program executable by a processor that performs a method of various embodiments.

Also, the various methods or processes outlined herein can be coded as software that is executable on one or more processors that employ any one of a variety of operating systems or platforms. Additionally, such software can be written using any of a number of suitable programming languages and/or programming or scripting tools, and also can be compiled as executable machine language code or intermediate code that is executed on a framework or virtual machine. Typically, the functionality of the program modules can be combined or distributed as desired in various embodiments.

Also, the embodiments of the present disclosure can be embodied as a method, of which an example has been provided. The acts performed as part of the method can be ordered in any suitable way. Accordingly, embodiments can be constructed in which acts are performed in an order different than illustrated, which can include performing some acts concurrently, even though shown as sequential acts in illustrative embodiments.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A system, comprising:

a computer system including a user interface and a monitor;

a storage medium readable by the computer system and storing an application to interface the computer system and a at least one streaming media device;

at least one universal serial bus (USB) port operably coupled to the computer system and configured to interface with the at least one streaming media device;

a laser scanner to scan a bar code indicating identification data of the at least one streaming media device;

wherein the computer system, by executing the application, is configured to automatically:

read, via the physical USB connection, a device serial number stored on the streaming media device;

compare the device serial number read via the USB connection with the scanned identification data to validate an identity of the streaming media device;

only upon successful validation of the identity, compare a version of the firmware stored on the non-transitory computer-readable medium within the computer system to a known latest version of the firmware stored in a database;

determine if the firmware is the most up to date version;

flash firmware stored on the non-transitory computer-readable medium within the computer system to the streaming media device; and boot check the at least one streaming media device via the USB port;

wherein the boot check is completed by monitoring boot status signals received through the physical USB connection during device startup.

2. The system of claim 1, further comprising a USB hub connected to the at least one USB port configured to connect one to sixteen streaming media devices to the computer system;

wherein, the USB hub includes more USB ports that that of the at least one USB port.

3. The system of claim 2 that automatically performs detecting, validating, flashing, boot checking, and recording data when clearing and updating the one to sixteen streaming media device(s) simultaneously.

4. The system of claim 2, further comprising:

wherein, the computer system, by running the application, automatically:

detects the at least one streaming media device after the streaming media device has been connected to the USB hub, compares the identification data scanned by the laser scanner to the serial number of the at least on streaming media device;

validates the current firmware of at least one streaming media device prior to flashing firmware;

flashes firmware to the streaming media device only if a serial number of the at least one streaming media device matches that of the scanned identification data and the firmware validation fails, validates the firmware flashed to the streaming media device, verifies that the streaming media device boots properly after flashing the firmware, and records a result of running the application.

5. The system of claim 1, further comprising: a graphical user interface (GUI) shown on the monitor;

Wherein the GUI displays:

a listing of process steps for corresponding to each streaming media device, a listing of error codes, a device status corresponding to each streaming media device, and a clickable process start button corresponding to each streaming media device.

6. A method, comprising:

scanning, using a laser barcode scanner, a serial number from a physical label affixed to a streaming media device into a computer system;

connecting the streaming media device to the computer system via a physical universal serial bus (USB) cable to a USB hub that is communicatively coupled to the computer system;

reading, via the USB connection, a serial number stored on the streaming media device;

validating an identity of the streaming media device by comparing the serial number read via the USB connection with the scanned serial number;

only when the identity is validated, comparing a version of firmware stored on a non-transitory computer-readable storage medium of the computer system to a known latest firmware version stored in a database;

flashing firmware and boot checking the streaming media device using a custom software application stored on a non-transitory computer-readable medium within the computer system;

verifying that the streaming media device boots properly by monitoring boot status signals received through the physical USB connection during startup of the streaming media device; and automatically recording a result of the flashing firmware and the boot checking into a database of the computer system.

7. The method of claim 6, wherein an entering of the serial number of the streaming media device includes scanning, using the laser barcode scanner, a bar code affixed on the streaming media device.

8. The method of claim 6, further comprising automatically detecting the streaming media device by the computer system and the custom software application, via a physical USB connection between the streaming media device and a USB hub communicatively coupled to the computer system.

9. The method of claim 6, wherein performing the flashing firmware to the streaming media device includes transmitting commands via the physical USB connection to set access flags on the streaming media device to place the streaming media device into a diagnostic mode.

10. The method of claim 9, further comprising transmitting commands via the USB connection to reset access flags on the streaming media device to restrict access to the streaming media device.

11. The method of claim 6, further comprising comparing a version of the firmware retrieved from the streaming media device via the USB connection to a version of the firmware previously flashed to the streaming media device.

12. The method of claim 6, wherein connecting the streaming media device includes physically connecting one to sixteen streaming media devices via USB cables to the USB hub communicatively coupled to the computer system.

13. The method of claim 12, wherein the flashing firmware and boot checking of the one to sixteen streaming media devices is performed simultaneously via the USB hub to each of the one to sixteen streaming media devices physically connected to the computer system.

14. The method of claim 12, wherein the computer system includes a monitor displaying a graphical user interface showing a status of the method for each of the one to sixteen streaming media devices.

15. The method of claim 6, wherein the computer system includes a monitor displaying a graphical user interface showing a status of the method for the streaming media device.

16. The method of claim 6, wherein the automatically recording the result includes saving a data record including a model and the serial number of the streaming media device, a version of the flashed firmware, and verification that the streaming media device booted properly.

* * * * *